(12) United States Patent
Bitton et al.

(10) Patent No.: US 10,746,522 B2
(45) Date of Patent: Aug. 18, 2020

(54) MEASUREMENT MARKING DEVICE

(71) Applicants: David Bitton, Herzeliya (IL); Omer Ben-Omri, Herzeliya (IL); Uri Talmi, Prague (CZ)

(72) Inventors: David Bitton, Herzeliya (IL); Omer Ben-Omri, Herzeliya (IL); Uri Talmi, Prague (CZ)

( * ) Notice: Subject to any disclaimer, the term of this patent is extended or adjusted under 35 U.S.C. 154(b) by 0 days.

(21) Appl. No.: 15/727,647

(22) Filed: Oct. 9, 2017

(65) Prior Publication Data
US 2018/0283838 A1  Oct. 4, 2018

Related U.S. Application Data

(63) Continuation of application No. 14/390,399, filed as application No. PCT/IL2013/050304 on Apr. 2, 2013, now Pat. No. 9,816,795.

(60) Provisional application No. 61/619,438, filed on Apr. 3, 2012.

(51) Int. Cl.
| | |
|---|---|
| *G01B 3/1061* | (2020.01) |
| *G01B 3/1084* | (2020.01) |
| *B25H 7/04* | (2006.01) |
| *G01B 3/1089* | (2020.01) |

(52) U.S. Cl.
CPC ............ *G01B 3/1084* (2013.01); *B25H 7/04* (2013.01); *G01B 3/1089* (2020.01); *G01B 2003/1066* (2013.01)

(58) Field of Classification Search
CPC ................ G01B 2003/1066; G01B 2003/1079
See application file for complete search history.

(56) References Cited

U.S. PATENT DOCUMENTS

| | | | | |
|---|---|---|---|---|
| 4,999,924 A * | 3/1991 | Shields | ............... | G01B 3/1071 33/770 |
| 6,178,655 B1 * | 1/2001 | Potter | ..................... | B25H 7/04 33/42 |
| 6,804,898 B1 * | 10/2004 | Hsu | ........................ | B43K 8/003 33/668 |
| 7,490,415 B1 * | 2/2009 | Cubbedge | ............ | G01B 3/1071 33/770 |
| 2012/0073155 A1 * | 3/2012 | Mabey | ................ | G01B 3/1005 33/770 |

* cited by examiner

*Primary Examiner* — Charlie Y Peng

(57) ABSTRACT

Disclosed is a measurement marking device for attachment onto a measuring tape or ruler; wherein the attached measurement marking device may slide/travel along the measuring tape or ruler, and set measurement(s) marking(s) onto the measured object at desired measurements/locations/sizes/lengths.

2 Claims, 12 Drawing Sheets

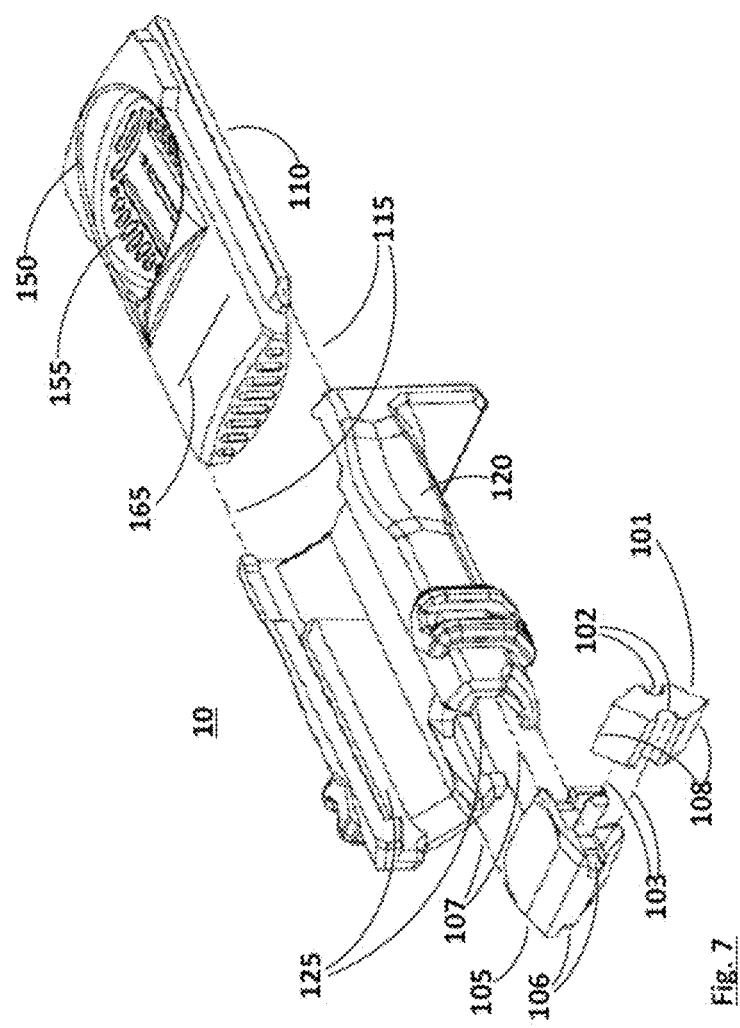

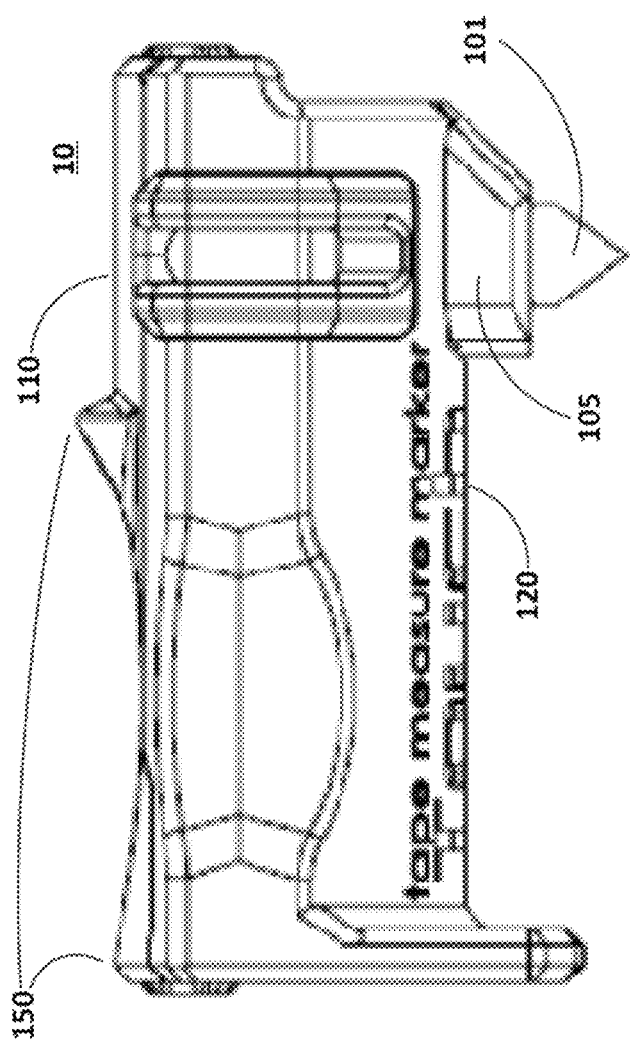

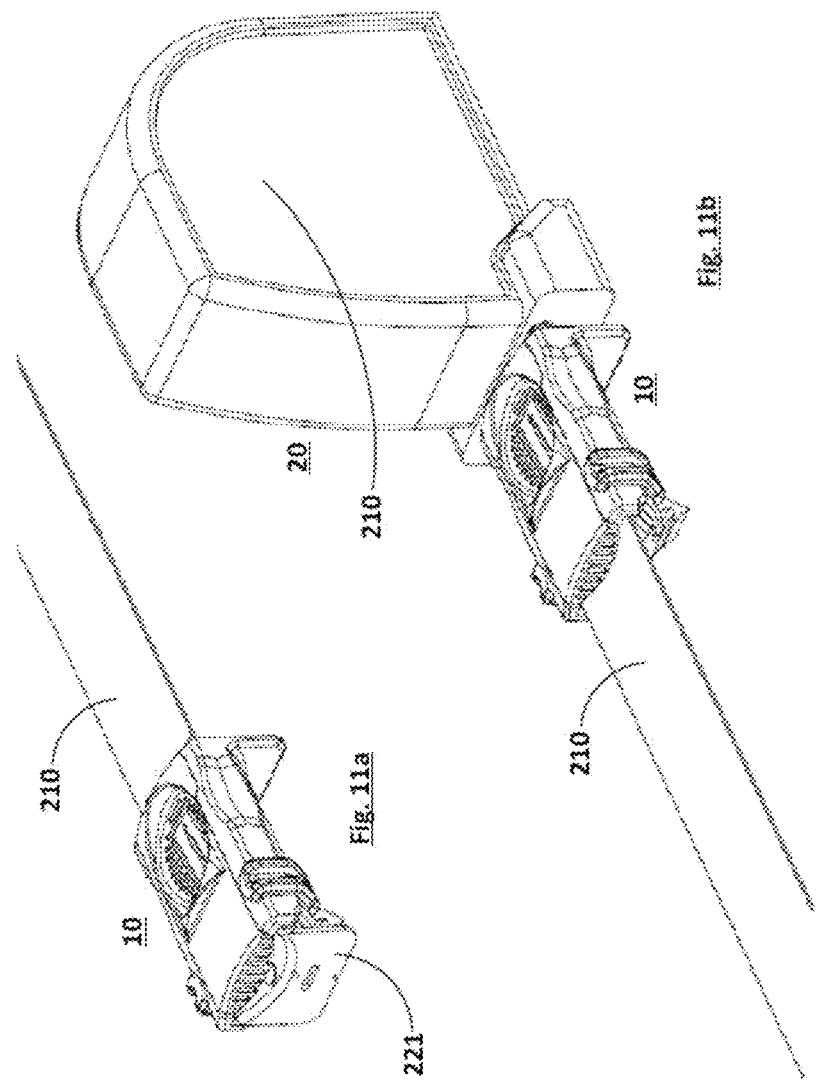

MEASUREMENT MARKING DEVICE

FIELD OF THE INVENTION

The present invention generally relates to working tools. More specifically, the present invention relates to a measurement marking device.

BACKGROUND

A tape measure or measuring tape is a flexible form of ruler. It consists of a ribbon of cloth, plastic, fiber glass, or metal strip with linear-measurement markings. It is a common measuring tool. Its flexibility allows for a measure of great length to be easily carried in pocket or toolkit and permits one to measure around curves or corners. Today it is ubiquitous, even appearing in miniature form as a keychain fob, or novelty item. Surveyors use tape measures in lengths of over 100 m (300+ft).

Tape measures that were intended for use in tailoring or dressmaking were made from flexible cloth or plastic. Today, measuring tapes made for sewing are made of fiberglass, which does not tear or stretch as easily. Measuring tapes designed for carpentry or construction often use a stiff, curved metallic ribbon that can remain stiff and straight when extended, but retracts into a coil for convenient storage. A tape measure of 25 or even 100 feet can wind into a relatively small container.

The design on which most modern spring tape measures are built was patented by a New Haven, Conn. resident named Alvin J. Fellows on 14 Jul. 1868. According to the text of his patent, Fellows' tape measure was an improvement on other versions previously designed.

The spring tape measure has existed since Fellows' patent in 1868, but did not come into wide usage until the early 1900s, when it slowly began to supplant a common folding wooden design of carpenter's ruler.

On 3 Jan. 1922, Hiram Farrand received the patent he filed in 1919. Sometime between 1922 and December 1926 Farrand experimented with the help of The Brown Company in Berlin, N.H. It is there Hiram and W.W. Brown began mass producing the tape measure. Their product was later sold to Stanley Works.

Justus Roe, a surveyor and tape-maker by trade, made the longest tape measure in 1956, at 600 feet long. The Northern Virginia Surveyors Association presented the 600' long, gold-plated surveyor's tape measure to Micky Mantle in 1956. It now resides with other such memorabilia, behind glass in the entry area of Mickey Mantle's Steakhouse located in Oklahoma City, Okla.

Some tapes sold in the United States have additional marks in the shape of small black diamonds, which appear every 19.2 inches (490 mm). These are known as 'black truss' markings, and are used to mark out equal truss lengths for roofing materials (five trusses per standard 8 feet (2.4 m) length of building material). Many tapes also have special markings every 16 inches, which is a standard interval for studs in housing.

Taking the above into account, there clearly remains a need for a measurement marking device/apparatus/appliance for setting measurement markings onto an object being measured by a measure tape.

SUMMARY OF THE INVENTION

Below are described a measurement marking device and a number of innovative features thereof.

The present invention is a measurement marking device. According to some embodiments of the present invention, a measurement marking device may comprise: (1) a structure/shape for attaching/connecting/hooking-up the device onto, and possibly off of, a measuring tape and/or ruler, while allowing for the device to substantially freely travel along the measuring tape/ruler; and (2) a marker, connected to, and adapted to travel along with, the main structure of the device; for setting measurement markings on the measured object.

According to some embodiments of the present invention, the structure of the measurements marking device may enable its attachment onto the measuring tape. As the measuring tape is extended (e.g. pulled out of its storage compartment/casing) to the size of a desirable measurement, the attached device may be held by the user (e.g. using his thumb) and/or may be connected to the storage compartment of the tape, allowing the tape being extended to substantially freely pass/slide through the device, while keeping the device substantially close to the storage compartment of the tape. Once the tape has been extended to, or beyond, the desirable measurement, the device may be pressed down and possibly moved back and forth (possibly along with the measuring tape compartment/reminder) in a direction which is substantially parallel to the surface of the measured object and substantially vertical to the tape of the measuring tape. The pressing down and/or back and forth movement of the device may cause the connected marker to mark the measurement to which the measuring tape has been extended to, onto the measured object. The measuring tape may then be further-extended/retracted to measure, and possibly mark using the device, additional measurement(s).

According to some embodiments of the present invention, the marking device may set measurement markings onto a measured object. According to some embodiments, as the tape of a measuring tape is being extended from within its storage compartment to the desirable measurement(s), the marking device may be held (e.g. by the thumb/index-finger of the user) keeping it substantially close to the storage compartment while the tape slides through it. According to some embodiments, once a desirable measurement has been reached, down force/pressure (i.e. towards the object being measured) may be applied to the device (e.g. by the thumb/index-finger of the user) that may be moved, possibly along with the storage compartment, back and forth, and possibly in a direction which is substantially parallel to the surface of the measured object and substantially vertical to the tape of the measuring tape. The back and forth movement may cause a marker attached to the bottom of the device to set (e.g. draw) a mark on the measured object at the desirable measurement. According to some embodiments, down force/pressure applied to the device may be sufficient for setting a mark(s) to the measured object; according to some embodiments, moving the device back and forth may be sufficient for setting a mark(s) to the measured object.

According to some embodiments of the present invention, the marking device may travel/slide substantially freely along the tape of the measuring tape and/or allow for the tape of the measuring tape to travel/slide freely through it (i.e. when the device is closed over the tape. According to some embodiments, the marking device may comprise two main parts, a top part and a bottom part, connected by attachment clip(s), other attachment solution(s) and/or a hinge/axis functionality solution, to allow for the two parts of device to be closed over the measuring tape. According to some embodiments, the device may be constructed as a single part/unit/mold (possibly excluding the marker), according to some embodiments, the device may comprise more than two main parts. The exemplary measurement marking device may further comprise a finger positioning opening/hole/dent/depression on/in its top. The finger positioning opening may allow a user to keep the device in place (e.g. close to the tape compartment) as measuring tape is stretched-out/extended, and/or to allow for the sliding of the device along the measuring tape to a desirable spot/measurement. According to some embodiments, the marking device may be constructed from various materials (e.g. plastic, metal, wood) and may be at least partially transparent. According to some embodiments, the device may comprise positioning line(s) on its upper/top side/part; the positioning lines may be set across from the marker attached to the bottom of the device; measurement markings/numerals on the tape me be visible through the transparent part of the device. According to some embodiments, the upper/top side/part of the device may comprise a transparent convex section that may act as a magnifying glass by enlarging measurement markings/numerals on the tape making them more easily visible/readable. According to some embodiments, the positioning line(s) may be set across of the marker of the device, such that when they are positioned over a certain measurement markings/numerals on the tape, the marker is likewise set to (marking) the same measurement.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings:

In FIG. 7 there is shown, in accordance with some embodiments of the present invention, an exploded view of the exemplary measurements marking device of FIG. 6;

Figure 6:
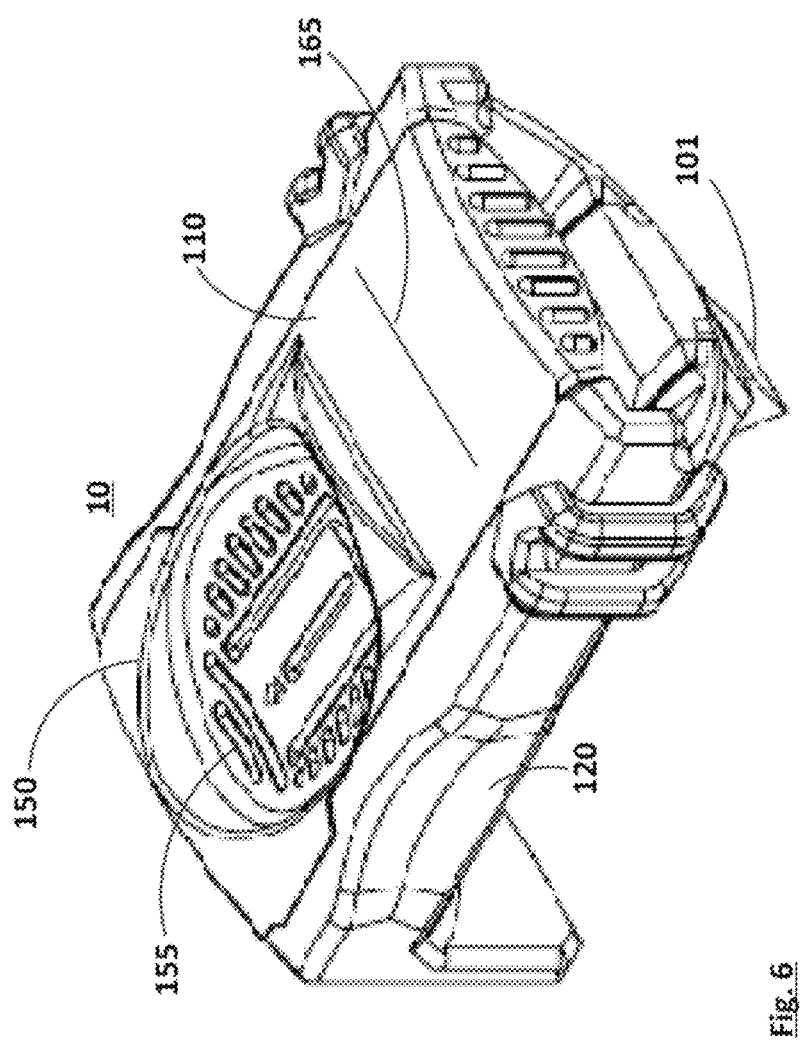
In FIG. 6 there is shown, in accordance with some embodiments of the present invention, an exemplary measurements marking device.

9B there is shown, in accordance with some embodiments of the present invention, a bottom view of the exemplary measurements marking device of FIG. 6;

In FIG. 10 there is shown, in accordance with some embodiments of the present invention, a side view of the exemplary measurements marking device of FIG. 6; and In FIGS. 11A and 11B there is shown, in accordance with some embodiments of the present invention, the exemplary measurements marking device of FIG. 6, attached onto the tape of a measuring tape.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and elements have not been described in detail so as not to obscure the present invention.

Unless specifically stated otherwise, as apparent from the following discussions, it is appreciated that throughout the specification discussions utilizing terms such as 'measure tape', 'measuring tape', 'ruler', or the like, refer to device comprising an elongated portion/shape/strip/structure onto which measurement numerals/lines are set. Further, the terms 'marker', 'marking-element', or the like, may relate to any mark, point, dot, sign, scratch, cut and/or drawing setting element or component that may be utilized as part of marking measurements onto a measured object.

Embodiments of the present invention may include apparatuses for performing the operations herein. Such apparatus may be specially constructed for the desired purposes, or it may comprise of general-purpose components.

The processes and components presented herein are not inherently related to any particular embodiment, various general-purpose devices, methods, systems and/or apparatuses may be used in accordance with the teachings herein, or it may prove convenient to construct more specialized devices, methods, systems and/or apparatuses to perform/produce the desired action. The desired structure for a variety of these devices, methods, systems and/or apparatuses will appear from the description below.

The present invention is a measurement marking device. According to some embodiments of the present invention, a measurement marking device may comprise: (1) a structure/shape for attaching/connecting/hooking-up the device onto, and possibly off of, a measuring tape and/or ruler, while allowing for the device to substantially freely travel along the measuring tape/ruler; and (2) a marker, connected to, and adapted to travel along with, the main structure of the device; for setting measurement markings on the measured object.

According to some embodiments of the present invention, the structure of the measurements marking device may enable its attachment onto the measuring tape. As the measuring tape is extended (e.g. pulled out of its storage compartment/casing) to the size of a desirable measurement, the attached device may be held by the user (e.g. using his thumb) and/or may be connected to the storage compartment of the tape, allowing the tape being extended to substantially freely pass/slide through the device, while keeping the device substantially close to the storage compartment of the tape. Once the tape has been extended to, or beyond, the desirable measurement, the device may be pressed down and possibly moved back and forth (possibly along with the measuring tape compartment/reminder) in a direction which is substantially parallel to the surface of the measured object and substantially vertical to the tape of the measuring tape. The pressing down and/or back and forth movement of the device may cause the connected marker to mark the measurement to which the measuring tape has been extended to, onto the measured object. The measuring tape may then be further-extended/retracted to measure, and possibly mark using the device, additional measurement(s).

According to some embodiments of the present invention, the marking device may set measurement markings onto a measured object. According to some embodiments, as the tape of a measuring tape is being extended from within its storage compartment to the desirable measurement(s), the marking device may be held (e.g. by the thumb/index-finger of the user) keeping it substantially close to the storage compartment while the tape slides through it. According to some embodiments, once a desirable measurement has been reached, down force/pressure (i.e. towards the object being measured) may be applied to the device (e.g. by the thumb/index-finger of the user) that may be moved, possibly along with the storage compartment, back and forth, and possibly in a direction which is substantially parallel to the surface of the measured object and substantially vertical to the tape of the measuring tape. The back and forth movement may cause a marker attached to the bottom of the device to set (e.g. draw) a mark on the measured object at the desirable measurement. According to some embodiments, down force/pressure applied to the device may be sufficient for setting a mark(s) to the measured object; according to some embodiments, moving the device back and forth may be sufficient for setting a mark(s) to the measured object.

According to some embodiments of the present invention, the marking device may travel/slide substantially freely along the tape of the measuring tape and/or allow for the tape of the measuring tape to trawl/slide freely through it (i.e. when the device is closed over the tape. According to some embodiments, the marking device may comprise two main parts, a top part and a bottom part, connected by attachment clip(s), other attachment solution(s) and/or a hinge/axis functionality solution, to allow for the two parts of device to be closed over the measuring tape. According to some embodiments, the device may be constructed as a single part/unit/mold (possibly excluding the marker), according to some embodiments, the device may comprise more than two main parts. The exemplary measurement marking device may further comprise a finger positioning opening/hole/dent/depression on/in its top. The finger positioning opening may allow a user to keep the device in place (e.g. close to the tape compartment) as measuring tape is stretched-out/extended, and/or to allow for the sliding of the device along the measuring tape to a desirable spot/measurement. According to some embodiments, the marking device may be constructed from various materials (e.g. plastic, metal, wood) and may be at least partially transparent. According to some embodiments, the device may comprise positioning line(s) on its upper/top side/part; the positioning lines may be set across from the marker attached to the bottom of the device; measurement markings/numerals on the tape me be visible through the transparent part of the device. According to some embodiments, the upper/top side/part of the device may comprise a transparent convex section that may act as a magnifying glass by enlarging measurement markings/numerals on the tape making them more easily visible/readable. According to some embodiments, the positioning line(s) may be set across of the marker of the device, such that when they are positioned over a certain measurement markings/numerals on the tape, the marker is likewise set to (marking) the same measurement.

Figure 1A:
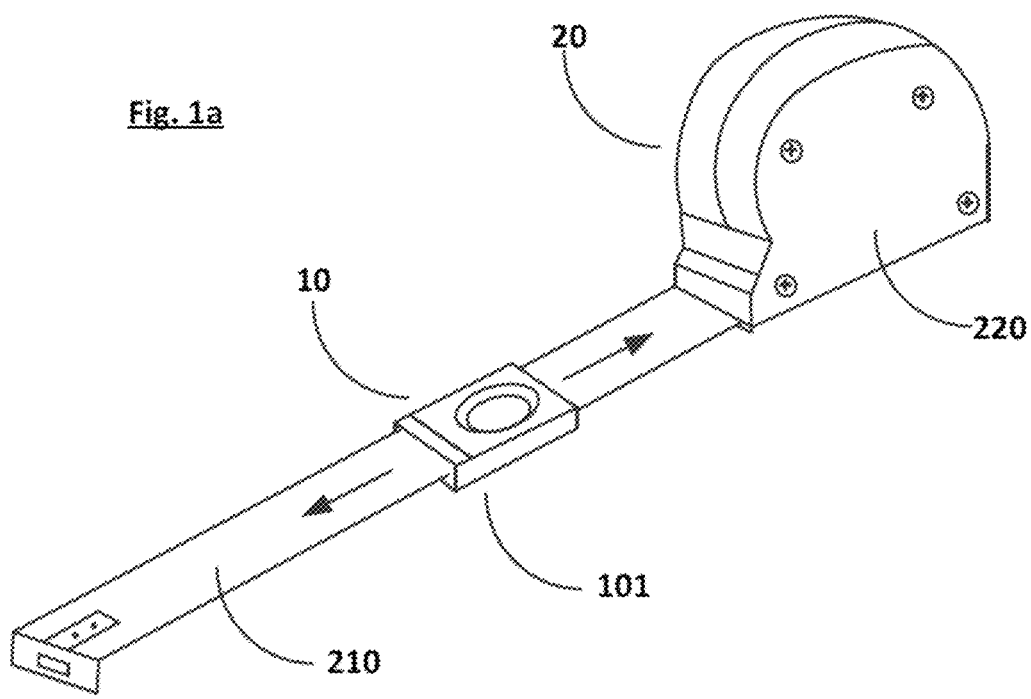
In FIGS. 1a-1b there are shown, in accordance with some embodiments of the present invention, exemplary measurement marking devices.

In FIG. 1A there is shown, in accordance with some embodiments of the present invention, an exemplary measurement marking device (10) attached onto a measuring tape (20). The measurement marking device (10) may travel/slide substantially freely along the tape (210) of the measuring tape, in the direction of the arrows, towards the storage compartment (220) of the measuring tape or away from it.

Figure 1B:
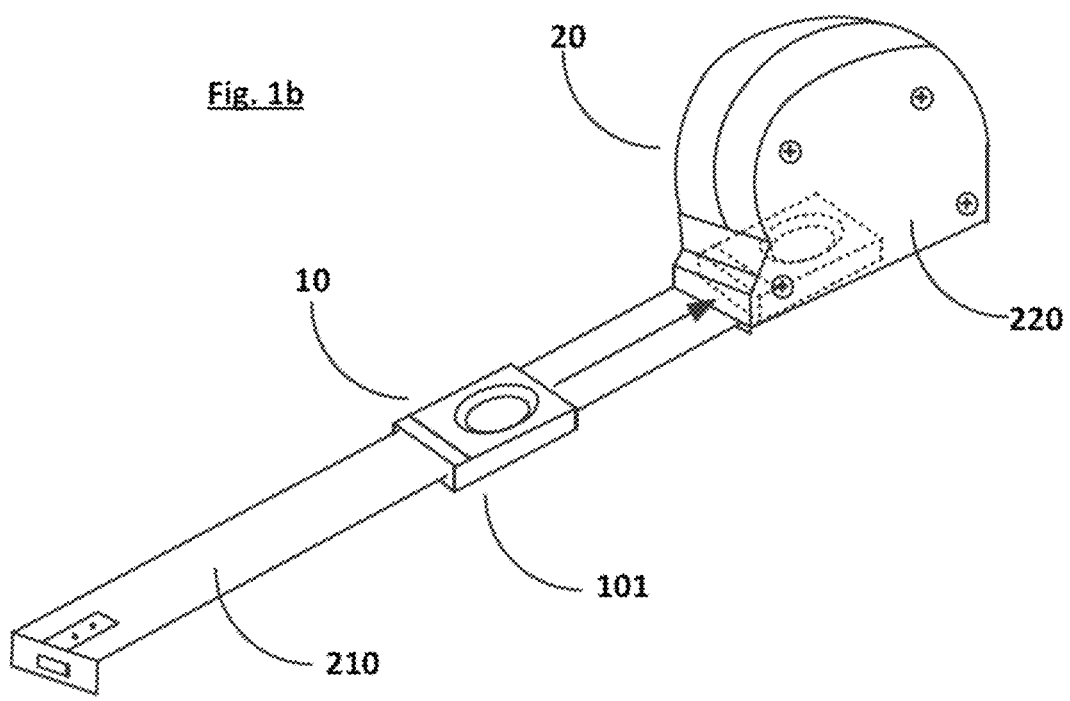

In FIG. 1B there is shown, in accordance with some embodiments of the present invention, an exemplary measurement marking device (10) attached onto a measuring tape (20). Wherein the measurement marking device (10) may travel/slide substantially freely along the tape (210) of the measuring tape and may further travel/slide towards, and at least partially into, the storage compartment (220) of the measuring tape.

Figure 2:
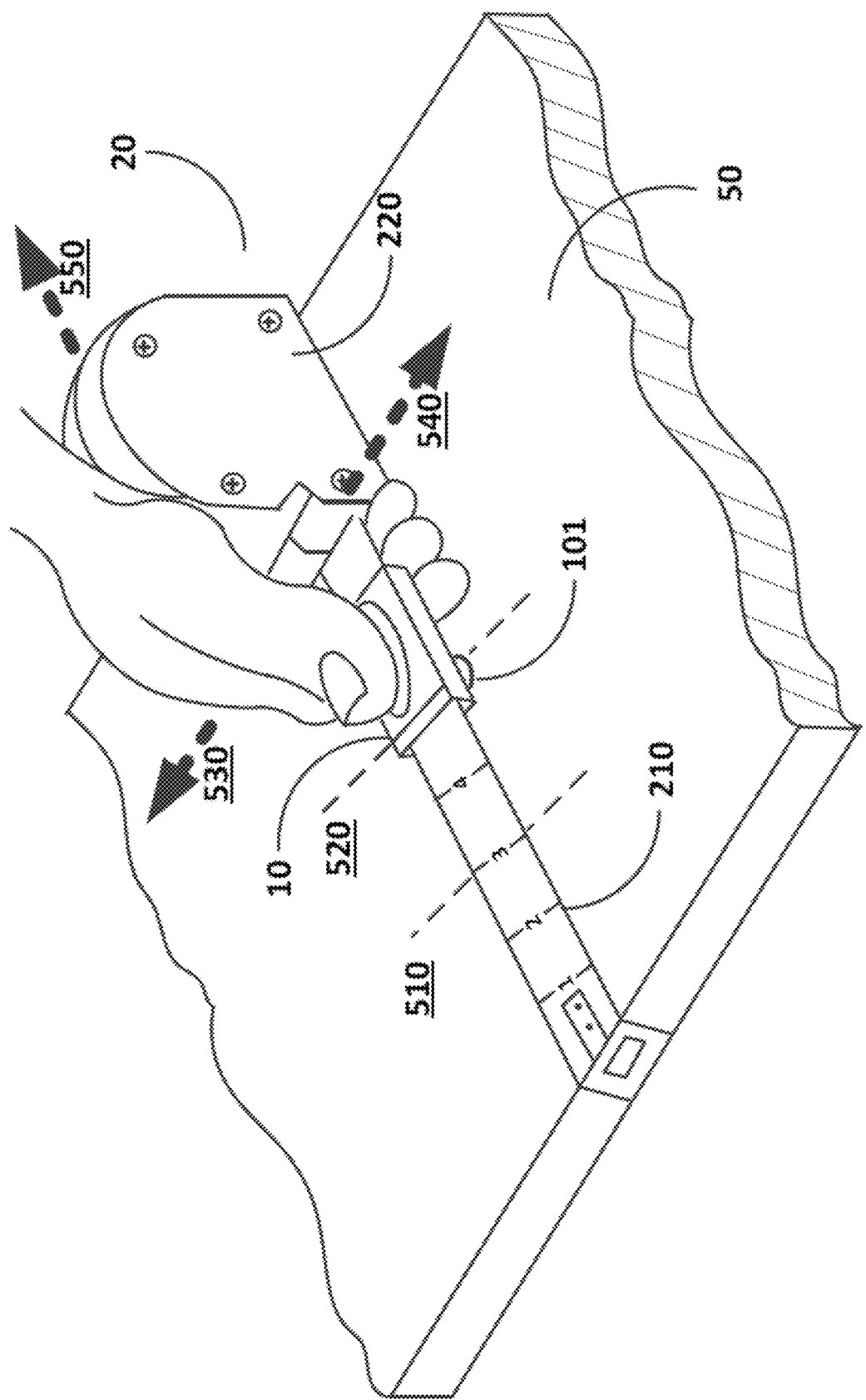
In FIG. 2 there is shown, in accordance with some embodiments of the present invention, an exemplary usage cycle of a measurement marking device.

In FIG. 2 there is shown, in accordance with some embodiments of the present invention, an exemplary usage cycle of a measurement marking device (10) for setting measurement markings onto a measured object (50). As the tape (210) of the measuring tape (20) is being extended from within its storage compartment (220) to the desirable measurement(s), the marking device (10) is held by the thumb of the user keeping it substantially close to the storage compartment (220) while the tape (210) slides through it. Once the desirable measurement has been reached the user may apply down pressure (i.e. towards the object being measured (50)) to the device (10) using his thumb, and move the device, possibly along with the storage compartment (220), back and forth in the direction of the arrows (530, 540; i.e. in a direction which is substantially parallel to the surface of the measured object and substantially vertical to the tape of the measuring tape). The back and forth movement may cause a marker (101) attached to the bottom of the device to set (e.g. draw) a mark on the measured object at the desirable measurement. In this exemplary figure, a 3 centimeter mark (510) has been set and a 5 centimeter mark (520) is being set.

Figure 3A:
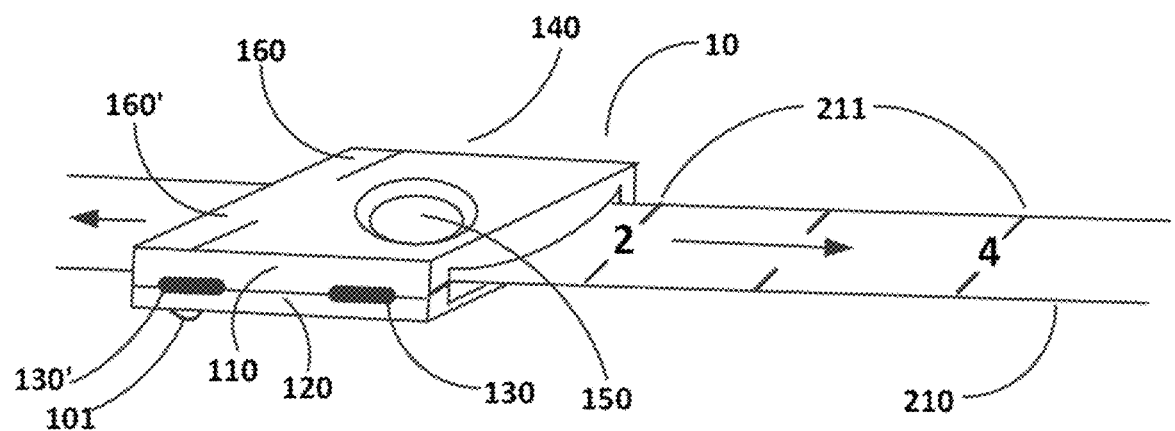
In FIG. 3a there is shown in further detail, in accordance with some embodiments of the present invention, an exemplary measurement marking device.

In FIG. 3a there is shown in further detail, in accordance with some embodiments of the present invention, an exemplary measurements marking device (10) attached onto a measuring tape. The measurements marking device (10) may travel/slide substantially freely along the tape (210) of the measuring tape, in the direction of the arrows. The exemplary marking device (10) shown, comprises: a top part (110) and a bottom part (120) connected by attachment clips (130, 130') that keep the two parts closed together over the tape. The other side of the device (140) may comprise another one or more clips or attachment solution(s) or a hinge/axis functionality solution, to allow for the two parts of device (110, 120) to be closed over the tape (210), while allowing for the device (10) to substantially free travel/slide along the tape (210). The exemplary measurements marking device (10) shown further comprises a finger positioning opening/hole/dent/depression (150) on/in the top part (110) of the device. The finger positioning opening (150) may allow a user to keep the device in place (e.g. close to the tape compartment) as tape (210) is stretched-out/extended. According to some embodiments, the top part (110) and/or the bottom part (120) of the device may be at least partially transparent. The device may comprise positioning line(s) (160, 160'), on its upper part (110), set across of the marker (101) attached to the bottom part (120) of the device. Measurement markings/numerals (211) on the tape may be visible through the transparent upper part (110), and since the positioning line(s) (160, 160') are set across of the marker (101), when they are positioned over a certain measurement markings/numerals (211) on the tape, the marker (101) is likewise set to (marking) the same measurement.

Figure 3B:
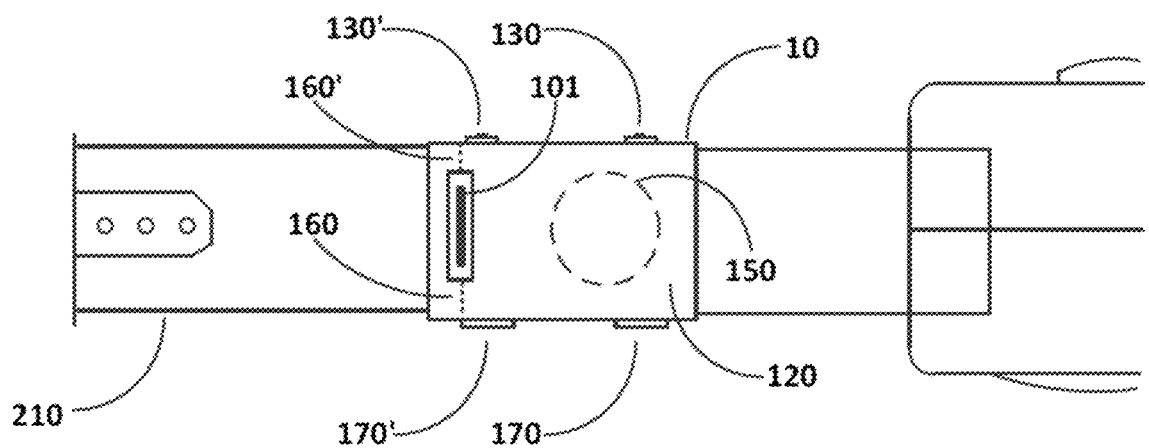
In FIG. 3b there is shown in bottom view and in further detail, in accordance with some embodiments of the present invention, an exemplary measurement marking device.

In FIG. 3b there is shown in bottom view and in further detail, in accordance with some embodiments of the present invention, an exemplary measurements marking device (10) attached onto a measuring tape. The measurements marking device (10) may travel/slide substantially freely along the tape (210) of the measuring tape. The exemplary marking device (10) shown, comprises: a top part (not shown) and a bottom part (120) connected by attachment clips (130, 130') that keep the two parts closed together over the tape. The other side of the device comprises two clips (170, 170') or attachment solution(s) or a hinge/axis functionality solution(s), to allow for the two parts of device to be closed over the tape (210), while allowing for the device (10) to substantially free travel/slide along the tape (210). The marker (101) connected to the bottom part (120) of the device is shown to be positioned across of the device positioning line(s) (160, 160' shown as broken/dotted lines) on its upper part. Further shown is the finger positioning opening/hole/dent/depression (150 shown as a broken/dotted circle) on/in the top part of the device. The finger positioning opening (150) may allow a user to keep the device in place (e.g. close to the tape compartment) as tape (210) is stretched-out/extended.

Figure 4A:
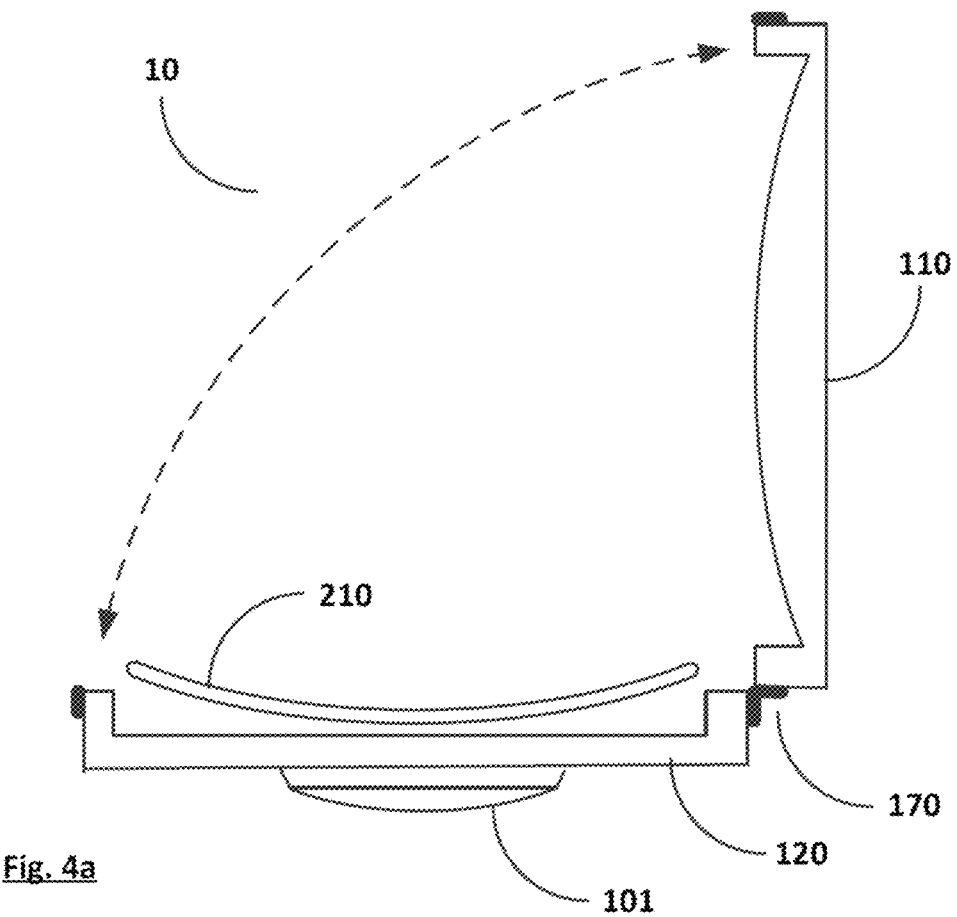
In FIG. 4a there is shown in slice/front view and in further detail, in accordance with some embodiments of the present invention, an exemplary measurement marking device in an open position.
Figure 4B:
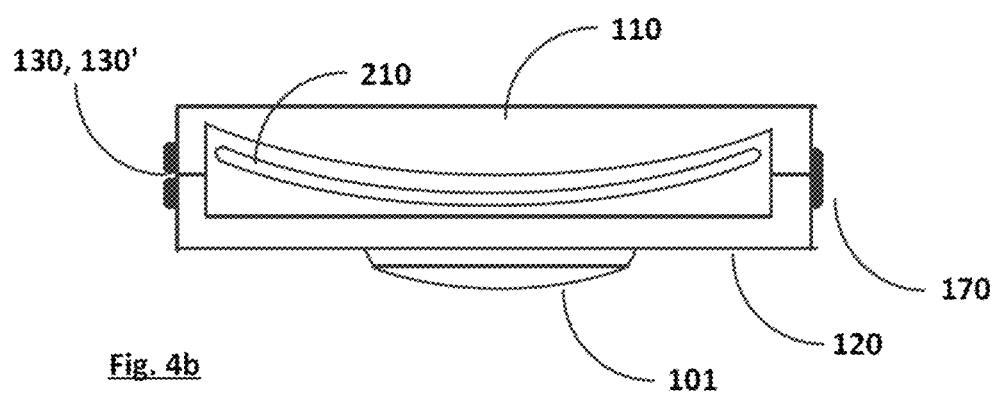
In FIG. 4b there is shown in slice/front view and in further detail, in accordance with some embodiments of the present invention, an exemplary measurement marking device in a closed position.

In FIGS. 4a and 4b there is shown in slice/front view and in further detail, in accordance with some embodiments of the present invention, an exemplary measurements marking device (10) comprising: a top part (110) and a bottom part (120); connection attachment clips (130, 130'); and another one or more clips or attachment solution(s), or a hinge/axis functionality solution (170)—to allow for the two parts of device (110, 120) to be closed over the tape (210). The measurement marking device is shown in its open position (FIG. 4a), wherein axis clip(s) (170) are open/flexed-out and attachment clips (130, 130') are disconnected from one another; the open device may allow for its positioning around the tape (210) of a measuring tape. In its closed position (FIG. 4b) the two parts of the device (110, 120) are closed over the tape (210) while allowing for the device (10) to substantially freely travel along the tape; the axis clip(s) (170) are closed/relaxed and the attachment clips (130) are connected to one another.

Figure 4C:
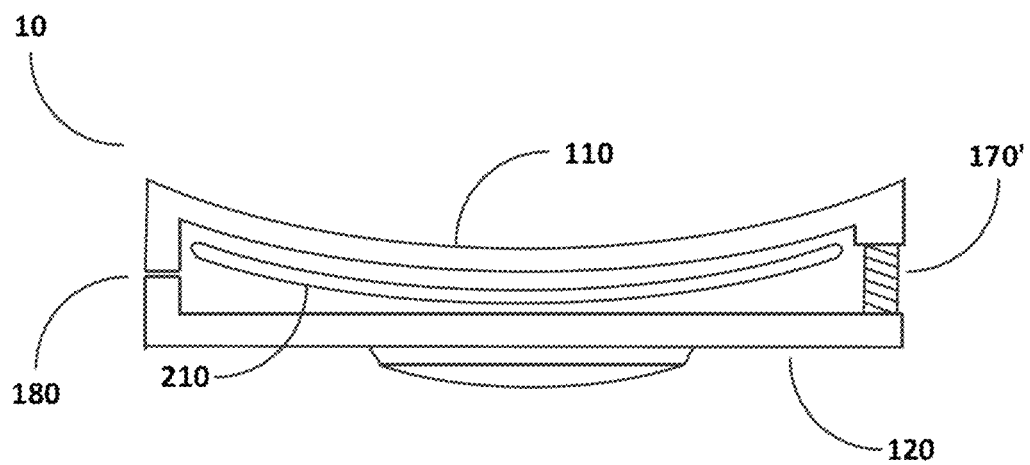
In FIG. 4c there is shown in slice/front view and in further detail, in accordance with some embodiments of the present invention, an exemplary measurement marking device comprising a spring based hinge/axis functionality opening/closing solution.

In FIG. 4c there is shown in slice/front view and in further detail, in accordance with some embodiments of the present invention, an exemplary measurements marking device (10) comprising: a top part (110) and a bottom part (120); and a spring based hinge/axis functionality solution (170)—to allow for the two parts of device (110, 120) to be closed over the tape (210). The measurement marking device (10) is shown in its closed position, wherein the two parts of the device (110, 120) are closed over the tape (210) while allowing for the device (10) to substantially freely travel along the tape; the spring (170) is partially stretched causing the tips of the device (180) to close/push against each other. Pulling the tips (180) away from each other, while causing the spring (170) to further stretch, may allow for the attachment and detachment of the device (10) from the tape (210) of a measuring tape.

Figure 4D:
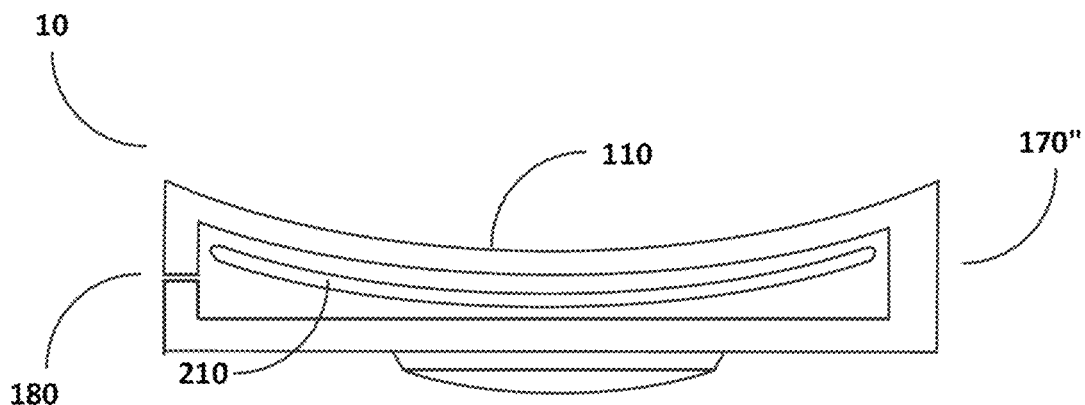
In FIG. 4d there is shown in slice/front view and in further detail, in accordance with some embodiments of the present invention, an exemplary measurement marking device made of one main part/mold comprising a flexible section/material based hinge/axis functionality opening/closing solution.

In FIG. 4d there is shown in slice/front view and in further detail, in accordance with some embodiments of the present invention, an exemplary measurements marking device (10) made of one main part/mold (110) (possibly excluding the marker); and a flexible section/material based hinge/axis functionality solution (170)—to allow for the main part/mold (110) of the device to be closed over the tape (210). The measurement marking device (10) is shown in its closed position, wherein the main part/mold (110) of the device is closed over the tape (210) while allowing for the device (10) to substantially freely travel along the tape; the flexible section/material (170) is partially stretched, or in its natural/relaxed position causing the tips of the device (180) to remain closed adjacent to each other. Pulling the tips (180) away from each other, while causing the flexible section/material (170) to bend, may allow for the attachment and detachment of the device (10) from the tape (210) of a measuring tape.

Figure 5A:
In FIGS. 5a through 5e there are shown in slice/front view, in accordance with some embodiments of the present invention, exemplary markers of measurement marking devices.
Figure 5B:
Figure 5C:
Figure 5D:
Figure 5E:
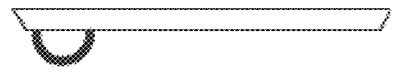

In FIGS. 5a through 5e there are shown in slice/front view, in accordance with some embodiments of the present invention, exemplary markers (101) of measurement marking devices. Markers may be of a round (5a), a triangular (5b), a rectangular (5c) or of any other shape; the device may comprise more than one marker, for example, as shown in FIG. 5d); and/or marker(s) may be positioned substantially at the center (5a-5c) or, for example, at the side of the device, as shown in FIG. 5e). According to some embodiments, marker(s) may be made of graphite, coal, chalk and/or any other marking/drawing material known today or to be devised in the future; according to some embodiments, marker(s) may contain and extract/apply ink or any other marking/drawing material known today or to be devised in the future; and/or, according to some embodiments, marker(s) may take the form of a razor, a blade, a puncture/hole making element, a burning/scorching element or any other form of marker, known today or to be devised in the future, adapted to set physical marking(s) on to the surface of a measured object.

Any subset or combination of the features, designs, components and/or elements, described in the context of the following exemplary embodiment of a measurement marking device, may be implemented—exclusively, or in combination with any other features, designs, components and/or elements associated with a measurement marking device.

In FIG. 6 there is shown, in accordance with some embodiments of the present invention, an exemplary measurements marking device (10). The exemplary marking device (10) shown, comprises: a top part (110) adapted to slide and fit into tracks on a bottom part (120) keeping the two parts closed together over the tape of a measuring tape. The exemplary measurements marking device (10) shown further comprises a finger positioning opening/hole/dent/depression (150) on/in the top part (110) of the device. The finger positioning opening (150) comprises traction lines (155) to allow for a better grip by the user. The device comprises a positioning line (165), on its upper part (110), set across of a marker (101) attached to the bottom part (120) of the device. The top part (110) of the device is transparent for allowing Measurement markings/numerals on a tape (210) of a measuring tape to be visible through the transparent upper part (110), and since the positioning line (165) is set across of the marker (101), when the positioning line is positioned over a certain measurement markings/numerals on the tape, the marker (101) is likewise set to (marking) the same measurement.

In FIG. 7 there is shown, in accordance with some embodiments of the present invention, an exploded view of the exemplary measurements marking device (10) of FIG. 6. The exemplary marking device (10) shown, comprises: the top part (110) adapted to slide, along the dotted lines (115), and fit into tracks (125) on the bottom part (120) for keeping the two parts closed together over the tape of a measuring tape. The marker (101) attached to the bottom part (120) of the device comprises dents (102) to allow for it to slide along the dotted lines (103) into a marker housing (105). The marker housing (105) comprises tracks (106) to allow for it to slide along the dotted lines (107), and click to position, within the front of the bottom part (120). The marker (101) shown, comprises two pointed tips (108) allowing its connection to the marker housing (105) with either of the pointed tips (108) facing down and sticking out of the housing, for example, when a first tip of the pointed tips (108) has worn out and become blunt from usage.

Figure 8B:
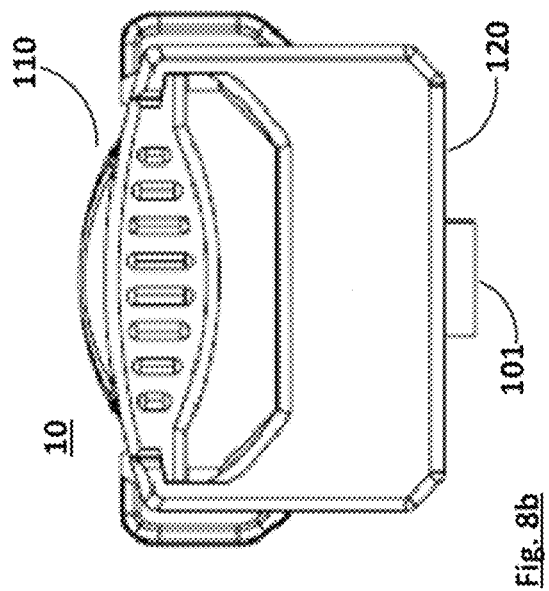
In FIG. 8B there is shown, in accordance with some embodiments of the present invention, a rear view of the exemplary measurements marking device of FIG. 6.
Figure 8A:
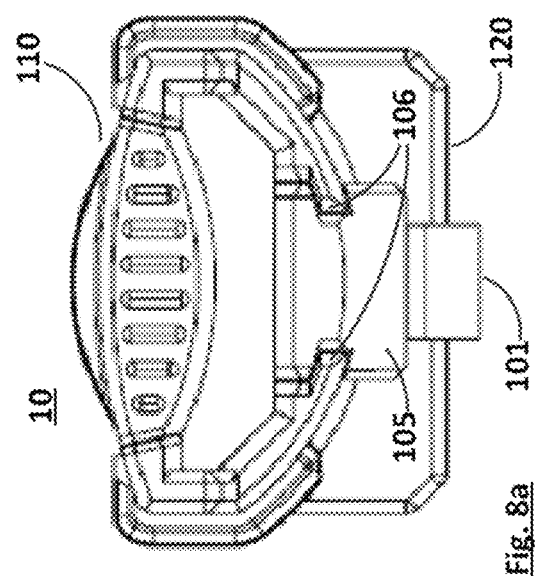
In FIG. 8A there is shown, in accordance with some embodiments of the present invention, a front view of the exemplary measurements marking device of FIG. 6.

In FIG. 8A there is shown, in accordance with some embodiments of the present invention, a front view of the exemplary measurements marking device (10) of FIG. 6. The measurements marking device (10) shown comprises the top part (110), the bottom part (120) and the marker (101). Further shown are the marker housing (105), and the marker housing (105) tracks (106), allowing for it to slide, and click to position, within the front of the bottom part (120). In FIG. 8B there is shown, in accordance with some embodiments of the present invention, a rear view of the exemplary measurements marking device (10) of FIG. 6. The measurements marking device (10) shown comprises the top part (110), the bottom part (120) and the marker (101).

Figure 9A:
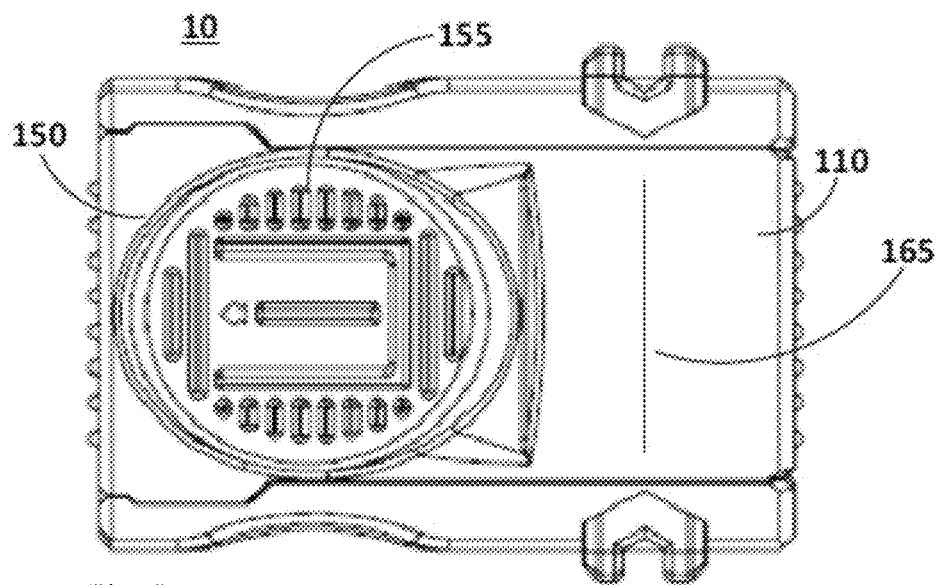
In FIG. 9A there is shown, in accordance with some embodiments of the present invention, a top view of the exemplary measurements marking device of FIG. 6.
Figure 9B:
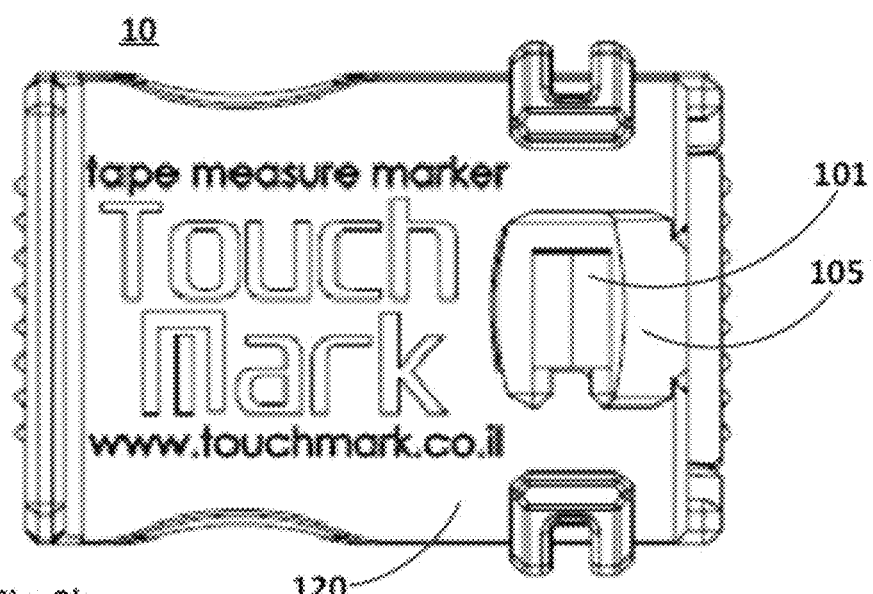

In FIG. 9A there is shown, in accordance with some embodiments of the present invention, a top view of the exemplary measurements marking device (10) of FIG. 6. The measurements marking device (10) shown comprises the top transparent part (110). Further shown are the finger positioning opening/hole/dent/depression (150) on/in the top part (110) of the device and its traction lines (155) allowing for a better grip by the user; and the positioning line (165), set across of the marker (101 not shown) attached to the bottom part of the device. In FIG. 9B there is shown, in accordance with some embodiments of the present invention, a bottom view of the exemplary measurements marking device (10) of FIG. 6. The measurements marking device (10) shown comprises the bottom part (120). Further shown are the marker (101) and the marker housing (105) positioned across of the positioning line (165 not shown).

In FIG. 10 there is shown, in accordance with some embodiments of the present invention, a side view of the exemplary measurements marking device (10) of FIG. 6. The measurements marking device (10) shown comprises the top transparent part (110), the bottom part (120) into which the top part slides. Further shown are the marker (101) positioned across of the positioning line, the marker housing (105) and the finger positioning opening/hole/dent/depression (150) on/in the top part (110) of the device.

In FIGS. 11A and 11B there is shown, in accordance with some embodiments of the present invention, the exemplary measurements marking device (10) of FIG. 6, attached onto the tape (210) of a measuring tape (20), the device (10) can travel/slide substantially freely along the tape (210). In FIG. 11A the device is shown in a position adjacent to the starting point (i.e. 0 inches/centimeters measurement) of the tape (210), close to a 'measured object gripping' tip (221) of the measuring tape (20). In FIG. 11B the device is shown in a position adjacent to a storage compartment (220) of the measuring tape (20).

According to some embodiments of the present invention, a measurement marking device may comprise a main structure for connecting the device onto a measuring tape, while allowing for the device to substantially freely travel along the tape of the measuring tape, and a marker connected to the bottom of the main structure for setting measurement markings on a measured object. According to some embodiments, the main structure may comprise a top part and a bottom part and wherein said marker is connected to the bottom of said bottom part. According to some embodiments, the top part and the bottom part may be connected to each other using/by: hinges, an axle, clips, one part fitting into tracks on or grooves on the other, or any other means of connection.

According to some embodiments of the present invention, the top part of the measurement marking device may be transparent, and may comprise a positioning line set at a position directly across of the device marker. According to some embodiments, the top part may comprise a finger positioning dent on its top part. According to some embodiments, the marker may be integral with the bottom part of the device, according to other embodiments, the marker may be connected to and/or disconnected from the bottom part of the device. According to some embodiments, the measurement marking device may comprise a marker housing for hosting the marker, and connecting to and disconnecting from the bottom part of the device. According to some embodiments, the marker may comprise two pointed tips allowing its connection to the marker housing with either of the pointed tips facing down and sticking out of the housing.

According to some embodiments of the present invention, a measuring and marking device may comprise a measuring tape; and a measurement marking device comprising a main structure for connecting the device onto a measuring tape, while allowing for the device to substantially freely travel along the tape of the measuring tape; and a marker connected to, and adapted to travel along with, the main structure, for setting measurement markings on a measured object. According to some embodiments, the measuring tape may comprise a storage compartment for hosting its tape and at least part of the measurement marking device.

It is hereby made clear that various other usage ways, modes and scenarios of a measuring tape, and various types of measuring tapes and/or rulers, may utilize and/or benefit from any of the marking devices and/or features thereof, taught, suggested and/or associated within this application; these marking devices and/or features thereof, separately and/or in combination with any type of measuring tape or ruler, all fall within the true spirit of the present invention.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A marking device comprising:

a marker positioning structure adapted to be movably attached upon a tape portion of a measuring tape, wherein a surface of the tape portion marked with measurement markings is defined as the top surface of the tape portion, said marking positioning structure comprising:

a top component positioned above the tape portion when said structure is movably attached to the tape portion, said top component allowing view of the measurement markings from above when said structure is movably attached to the tape portion and comprising an indicator positioned to indicate a specific marking of the measurement markings at each given moment;

a bottom component attached to said top component, positioned beneath the tape portion when said structure is movably attached to the tape portion, said bottom component including a detachable marking tool positioned on the underside of said bottom component, so as to mark, directly beneath said indicator, upon a surface underneath said marker positioning structure, when downward pressure is applied to said marking tool;

a concave channel between said top component and said bottom component matching a shape of a cross section of the tape portion such as to allow said marker positioning structure to slide along the tape portion when said structure is movably attached to the tape portion;

a marking tool housing; and wherein said detachable marking tool comprises dents on its sides to fit and slide into complementary edges or rails of said marking tool housing and further comprises two pointed or sharp-edged opposite tips, enabling its connection to the underside of said bottom component with either the first tip of said two pointed or sharp-edged opposite tips, or the second opposite tip, facing down and sticking out of said bottom component.

2. The marking device according to claim 1, wherein said marking tool housing is structured to slide into and click into position, within a complementary groove on the front of said bottom component, such that the edges of the complementary groove prevent said detachable marking tool from sliding out of its position between the complementary edges or rails of said marking tool housing.

* * * * *